(12) United States Patent
Niimoto

(10) Patent No.: US 11,531,506 B2
(45) Date of Patent: Dec. 20, 2022

(54) IMAGE PROCESSING APPARATUS HAVING LOG GENERATION, CONTROL METHOD, AND STORAGE MEDIUM

(71) Applicant: Canon Kabushiki Kaisha, Tokyo (JP)

(72) Inventor: Keisuke Niimoto, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/394,648

(22) Filed: Aug. 5, 2021

(65) Prior Publication Data
US 2022/0050650 A1    Feb. 17, 2022

(30) Foreign Application Priority Data

Aug. 11, 2020    (JP) .............................. JP2020-135747

(51) Int. Cl.
*G06F 3/12*    (2006.01)
*B41J 2/175*    (2006.01)

(52) U.S. Cl.
CPC ........ *G06F 3/1273* (2013.01); *B41J 2/17546* (2013.01); *B41J 2/17566* (2013.01); *G06F 3/1204* (2013.01); *G06F 3/1234* (2013.01); *B41J 2002/17589* (2013.01)

(58) Field of Classification Search
None
See application file for complete search history.

(56) References Cited

U.S. PATENT DOCUMENTS

| | | | |
|---|---|---|---|
| 5,935,262 A * | 8/1999 | Barrett .................... | G06F 3/121 714/48 |
| 8,189,224 B2 * | 5/2012 | Nakagawa ............ | G06F 3/1219 358/1.14 |
| 8,670,148 B2 * | 3/2014 | Murakami ............ | G06F 3/1273 358/1.18 |
| 9,542,141 B2 * | 1/2017 | Nakayama ............ | G06F 3/1207 |
| 2007/0226776 A1 * | 9/2007 | Tsugawa ............... | G06F 21/608 726/1 |
| 2009/0009809 A1 * | 1/2009 | Kita ....................... | G03G 15/50 358/1.16 |

FOREIGN PATENT DOCUMENTS

JP    2010-105287 A    5/2010

* cited by examiner

*Primary Examiner* — Paul F Payer
(74) *Attorney, Agent, or Firm* — Venable LLP

(57) ABSTRACT

An image processing apparatus detects a change in job information which is information related to an execution of the job, and generates a log related to the processing of the job. In a condition that the job includes a plurality of pages, in a case where the change in the job information is not detected, one log is generated with the job as a unit, and in a case where the change in the job information is detected, a log is generated even during the job based on job information before the change. In a case where the change in the job information is detected at a first point in time, a log is generated as of the first point in time, and in a case where the change from the first point in time in the job information is detected at a second point in time which is a point later than the first point in time, a log from the first point in time to the second point in time is generated.

15 Claims, 11 Drawing Sheets

FIG.6A
PRINT LOG (PAGE1)

| LOG TYPE | PRINT LOG |
|---|---|
| JOB ID | 0001 |
| NUMBER OF PRINTED SHEETS | 1 |
| JOBMODE | COPY |
| MEDIA TYPE | NORMAL PAPER |
| MEDIA SIZE | A4 |
| MOUNTED INK TANK TYPE [Bk] | STANDARD INK TANK NOT TO BE CHARGED |
| MOUNTED INK TANK TYPE [CL] | STANDARD INK TANK NOT TO BE CHARGED |

FIG.6B
PRINT LOG (PAGE2~4)

| LOG TYPE | PRINT LOG |
|---|---|
| JOB ID | 0001 |
| NUMBER OF PRINTED SHEETS | 3 |
| JOBMODE | COPY |
| MEDIA TYPE | NORMAL PAPER |
| MEDIA SIZE | A4 |
| MOUNTED INK TANK TYPE [Bk] | INK TANK TO BE CHARGED |
| MOUNTED INK TANK TYPE [CL] | STANDARD INK TANK NOT TO BE CHARGED |

FIG.6C
PRINT LOG (PAGE5)

| LOG TYPE | PRINT LOG |
|---|---|
| JOB ID | 0001 |
| NUMBER OF PRINTED SHEETS | 1 |
| JOBMODE | COPY |
| MEDIA TYPE | NORMAL PAPER |
| MEDIA SIZE | A4 |
| MOUNTED INK TANK TYPE [Bk] | STANDARD INK TANK NOT TO BE CHARGED |
| MOUNTED INK TANK TYPE [CL] | STANDARD INK TANK NOT TO BE CHARGED |

| | | |
|---|---|---|
| FOR EACH PAGE | LOG TYPE | PRINT LOG |
| | JOB ID | 0001 |
| | PAGE NUMBER | 1 |
| | JOBMODE | COPY |
| | MEDIA TYPE | NORMAL PAPER |
| | MEDIA SIZE | A4 |
| | MOUNTED INK TANK TYPE [Bk] | LARGE STANDARD INK TANK NOT TO BE CHARGED |
| | MOUNTED INK TANK TYPE [CL] | MEDIUM STANDARD INK TANK NOT TO BE CHARGED |
| FOR EACH PAGE | LOG TYPE | PRINT LOG |
| | JOB ID | 0001 |
| | PAGE NUMBER | 2 |
| | JOBMODE | COPY |
| | MEDIA TYPE | NORMAL PAPER |
| | MEDIA SIZE | A4 |
| | MOUNTED INK TANK TYPE [Bk] | INK TANK TO BE CHARGED |
| | MOUNTED INK TANK TYPE [CL] | MEDIUM STANDARD INK TANK NOT TO BE CHARGED |

| LOG TYPE | PRINT LOG |
|---|---|
| JOB ID | 0001 |
| NUMBER OF PRINTED SHEETS (JOBMODE: COPY) | 5 |
| NUMBER OF PRINTED SHEETS (JOBMODE: PCPRINT) | 0 |
| NUMBER OF PRINTED SHEETS (JOBMODE: MAINTENANCE) | 0 |
| NUMBER OF PRINTED SHEETS (MEDIA TYPE: NORMAL PAPER) | 5 |
| NUMBER OF PRINTED SHEETS (MEDIA TYPE: GLOSSY PAPER) | 0 |
| NUMBER OF PRINTED SHEETS (MEDIA TYPE: MATTE PAPER) | 0 |
| NUMBER OF PRINTED SHEETS (MEDIA SIZE: A4) | 5 |
| NUMBER OF PRINTED SHEETS (MEDIA SIZE: POSTCARD) | 0 |
| NUMBER OF PRINTED SHEETS (MOUNTED INK BK: LARGE STANDARD INK TANK NOT TO BE CHARGED) | 2 |
| NUMBER OF PRINTED SHEETS (MOUNTED INK BK: MEDIUM STANDARD INK TANK NOT TO BE CHARGED) | 0 |
| NUMBER OF PRINTED SHEETS (MOUNTED INK BK: SMALL STANDARD INK TANK NOT TO BE CHARGED) | 0 |
| NUMBER OF PRINTED SHEETS (MOUNTED INK BK: INK TANK TO BE CHARGED) | 3 |
| NUMBER OF PRINTED SHEETS (MOUNTED INK CL: LARGE STANDARD INK TANK NOT TO BE CHARGED) | 0 |
| NUMBER OF PRINTED SHEETS (MOUNTED INK CL: MEDIUM STANDARD INK TANK NOT TO BE CHARGED) | 5 |
| NUMBER OF PRINTED SHEETS (MOUNTED INK CL: SMALL STANDARD INK TANK NOT TO BE CHARGED) | 0 |
| NUMBER OF PRINTED SHEETS (MOUNTED INK CL: INK TANK TO BE CHARGED) | 0 |
| ... | |

FOR EACH JOB

FIG. 7B

FIG.9A
PRINT LOG (PAGES 1-2)

| LOG TYPE | PRINT LOG |
|---|---|
| JOB ID | 0001 |
| NUMBER OF PRINTED SHEETS | 2 |
| JOBMODE | COPY |
| MEDIA TYPE | NORMAL PAPER |
| MEDIA SIZE | A4 |
| MOUNTED INK TANK TYPE [BK] | STANDARD INK TANK NOT TO BE CHARGED |
| MOUNTED INK TANK TYPE [CL] | STANDARD INK TANK NOT TO BE CHARGED |
| CONVEYING ROLLERS WEAR LEVEL | LEVEL 1 |
| MOTOR TEMPERATURE | NORMAL |

FIG.9B
PRINT LOG (PAGE 3)

| LOG TYPE | PRINT LOG |
|---|---|
| JOB ID | 0001 |
| NUMBER OF PRINTED SHEETS | 1 |
| JOBMODE | COPY |
| MEDIA TYPE | NORMAL PAPER |
| MEDIA SIZE | A4 |
| MOUNTED INK TANK TYPE [BK] | STANDARD INK TANK NOT TO BE CHARGED |
| MOUNTED INK TANK TYPE [CL] | STANDARD INK TANK NOT TO BE CHARGED |
| CONVEYING ROLLERS WEAR LEVEL | LEVEL 1 |
| MOTOR TEMPERATURE | HIGH TEMPERATURE LEVEL 1 |

FIG.9C
PRINT LOG
(PAGE 4)

| LOG TYPE | PRINT LOG |
|---|---|
| JOB ID | 0001 |
| NUMBER OF PRINTED SHEETS | 1 |
| JOBMODE | COPY |
| MEDIA TYPE | NORMAL PAPER |
| MEDIA SIZE | A4 |
| MOUNTED INK TANK TYPE [BK] | STANDARD INK TANK NOT TO BE CHARGED |
| MOUNTED INK TANK TYPE [CL] | STANDARD INK TANK NOT TO BE CHARGED |
| CONVEYING ROLLERS WEAR LEVEL | LEVEL 1 |
| MOTOR TEMPERATURE | NORMAL |

FIG.9D
PRINT LOG
(PAGE 5)

| LOG TYPE | PRINT LOG |
|---|---|
| JOB ID | 0001 |
| NUMBER OF PRINTED SHEETS | 1 |
| JOBMODE | COPY |
| MEDIA TYPE | NORMAL PAPER |
| MEDIA SIZE | A4 |
| MOUNTED INK TANK TYPE [BK] | STANDARD INK TANK NOT TO BE CHARGED |
| MOUNTED INK TANK TYPE [CL] | STANDARD INK TANK NOT TO BE CHARGED |
| CONVEYING ROLLERS WEAR LEVEL | LEVEL 1 |
| MOTOR TEMPERATURE | HIGH TEMPERATURE LEVEL 2 |

IMAGE PROCESSING APPARATUS HAVING LOG GENERATION, CONTROL METHOD, AND STORAGE MEDIUM

BACKGROUND OF THE INVENTION

Field of the Invention

The present invention relates to the technology of record control of a log.

Description of the Related Art

A log of information about a user's usage of an image forming apparatus, history, or the like is utilized for various types of service as well as trouble analysis on the image forming apparatus or a charging system.

Japanese Patent Laid-Open No. 2010-105287 (hereinafter referred to as PTL1) discloses a method for recording a log using an inkjet printer. In PTL1, each of page information generated for each page and job information generated for each job is stored as a log.

SUMMARY OF THE INVENTION

However, there is a possibility that the storage capacity of the image forming apparatus runs out in a case where both the log for each page and the log for each job are recorded as disclosed in PTL1.

An image processing apparatus according to an aspect of the present invention is an image processing apparatus which performs processing according to a job and includes a detection unit configured to detect a change in job information which is information related to the job, and a generation unit configured to generate a log related to the processing of the job. In a condition that the job includes a plurality of pages, in a case where the change in the job information is not detected by the detection unit, the generation unit generates one log with the job as a unit and in a case where the change in the job information is detected by the detection unit, the generation unit generates a log even during the job based on job information before the change.

Further features of the present invention will become apparent from the following description of exemplary embodiments with reference to the attached drawings.

BRIEF DESCRIPTION OF THE DRAWINGS

FIGS. 6A to 6C are diagrams showing an example of a log generated in processing the job;

FIGS. 7A and 7B are diagrams showing a log of a comparative example;

FIGS. 9A to 9D are diagrams showing a log to be generated.

DESCRIPTION OF THE EMBODIMENTS

Figure 1:
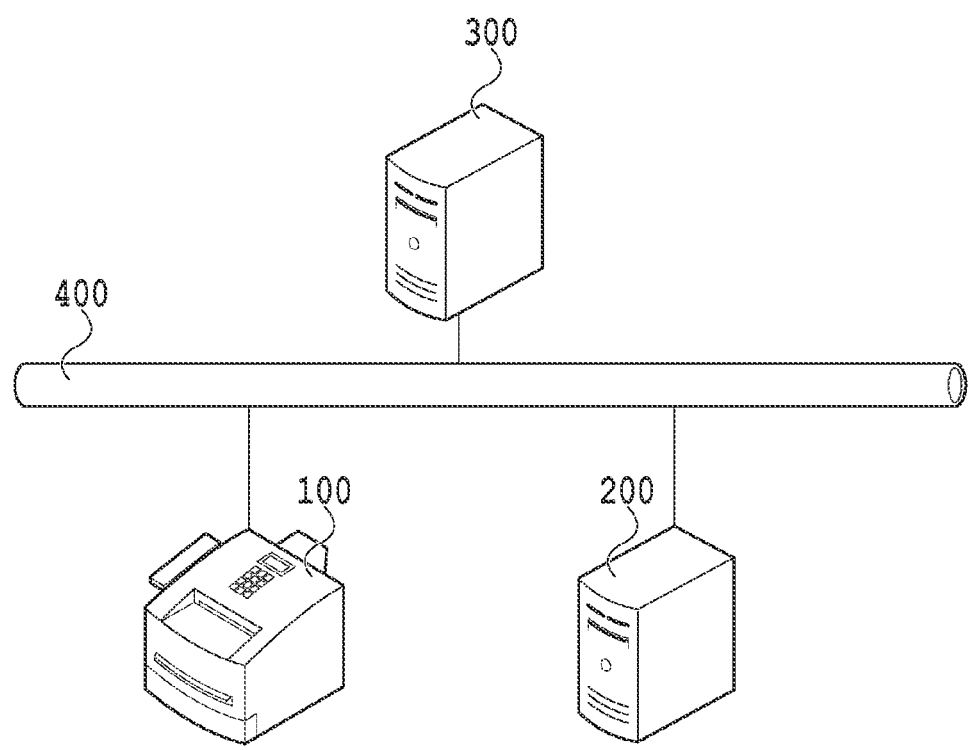
FIG. 1 is a diagram showing an example of a configuration of an entire information processing system.

Embodiments of the present invention will be described below with reference to the drawings. The following embodiments do not limit the present invention and not all of the combinations of features described in the present embodiments are essential as solving means of the present invention. The same reference numeral is assigned to the same constituent.

First Embodiment

Configuration of System

FIG. 1 is a diagram showing an example of a configuration of an entire information processing system in the present embodiment. The information processing system includes a Multi-Function Peripheral (MFP) 100, which is an image processing apparatus (image forming apparatus), a PC 200, and a log-collecting server 300. The PC 200 is connected to the MFP 100 via a communication network 400, The MFP 100 is connected to the PC 200 and the log-collecting server 300 via the communication network 400. More specifically, the communication network 400 is the Internet. For example, the MFP 100 is connected to a wireless LAN via an external access point and is further connected to the Internet by the function of a router that the external access point includes (that is, in a case where the external access point is a wireless LAN router). Thus, the MFP 100 is connected to the log-collecting server 300 via the Internet.

Upon connection of the MFP 100 to the communication network 400 for the first time, the MFP 100 communicates with the PC 200 and the log-collecting server 300 to register the MFP 100 with the log-collecting server 300. By registering the MFP 100 with the log-collecting server 300, the MFP 100 is associated with the log-collecting server 300, which brings a situation in which the MFP 100 and the log-collecting server 300 can mutually communicate with each other. The MFP 100 stores information in carrying out a job, replacing an ink tank, or the like in a storage medium inside the MFP 100 as a log. The stored log is transmitted from the MFP 100 to the log-collecting server 300 via the communication network 400. Control through HTTP, XMPP, or the like is performed over communications between the MFP 100 and the log-collecting server 300 and communications between the PC 200 and the MFP 100. Control using another protocol may be performed.

Summary of System

Next, before explaining each apparatus, supplementary explanations will be given of contents performed in the system as shown in FIG. 1 and possible problems. The log is regularly or irregularly transmitted from the MFP 100 to the log-collecting server 300 via the communication network 400. For example, with the consent of a user who uses the MFP 100, a log from the MFP 100 is transmitted to the log-collecting server 300. The log-collecting server 300 (or another server which receives log information from the log-collecting server 300) analyzes the trouble of the MFP 100 by analyzing the log and checks subscription service use status. In addition, by analyzing the log, a service provider suggests new service according to how the user uses the service, grants a privilege to a user who uses the service frequently, and the like. The subscription service is service in which the user can have specified service under subscription contract. The contents of the subscription contract are not limited particularly. For example, in the present embodiment, a contract is used in which the user can print up to a predetermined number of sheets using the ink of an ink tank which is a subscription service target (hereinafter also referred to simply as "service target") by paying a flat monthly rate. In a case where the number of printed sheets exceeds the predetermined number, the user is surcharged. A service target ink tank is a tank that the user is allowed to use only in the case where the subscription contract is concluded. The service target ink tank is the same type as a commercially available tank (hereinafter referred to as "general ink tank"), and both tanks are mountable on the MFP 100. However, the MFP 100 can distinguish between the service target ink tank and the general ink tank.

The MFP 100 stores the log in the storage medium inside the MFP 100 and transmits the stored log to the log-collecting server 300 via the communication network 400 at predetermined timing. The MFP 100 with poor recording capacity of a nonvolatile memory can cause a constraint on a storage area which can be used to store the log. In particular, in the case of a domestic MFP 100, it is necessary to reduce the cost of an apparatus main body as much as possible. Thus, it is difficult to mount a large-capacity nonvolatile memory in some cases. Further, in the case of the domestic MFP 100, a network is not necessarily connected to an Internet environment all the time. Thus, it is necessary in some cases to continue to retain, inside the MFP 100, the log which has not been able to be transmitted to the log-collecting server 300 via the communication network 400. Incidentally, although an example in which the MFP 100 is the domestic MFP has been described above to facilitate understanding, the above-described situation could occur similarly in the case of not only the domestic MFP but also an MFP for business purpose. Based on this, it is required that a limited storage area be used efficiently to store the log inside the MFP 100.

On the other hand, as a method for collecting the log, there are mainly two methods. A first method is a method for collecting the log for each page. A second method is a method for collecting the log for each job. In the case of collecting the log for each page, since the amount of information about the log increases proportionately as the number of pages included in the job increases, there is low effect of reducing the amount of information. Meanwhile, in the case of collecting the log for each job, even in a case where the number of pages included in the job increases, the amount of information about the log does not increase accordingly. For this reason, the effect of reducing the amount of information can be expected.

However, in collecting the log for each job, in the case of recording an item whose setting or condition changes for each page, for example, the kind of sheet or the type of ink tank to be used, the amount of information about the log increases. It is necessary, for example, to provide the log with a counter for counting the number of printed sheets for each item (for each kind of sheet or each type of ink tank). As a result, also in the case of collecting the log for each job, the amount of information sometimes increases. An explanation will be given below with a specific example.

As the specific example, a case is assumed where there exist three types of ink tanks which are A, B, and C and the number of sheets printed with these ink types is recorded as a log. In this case, items (records) of the log for each job are provided with a counter for counting the number of sheets printed with the ink tank type A, a counter for counting the number of sheets printed with the ink tank type B, and a counter for counting the number of sheets printed with the ink tank type C. It is further assumed that a job of printing five sheets is received, the first three sheets are printed with the ink tank type A, and the remaining two sheets are printed with the ink tank type B in replacement of the ink tank type A. In this case, information in which the number of sheets printed with the ink tank type A is three, the number of sheets printed with the ink tank type B is two, and the number of sheets printed with the ink tank type C is zero is recorded in one log.

In short, in recording the log for each job, it is necessary for items whose setting or condition changes for each page to be provided with counters the number of which is equal to the number of definitions thereof. In the above-described example, it is necessary to provide three counters in total for counting the numbers of sheets printed with the respective ink tank types A, B, and C. Accordingly, in a case where the number of items whose setting or condition changes for each page is large or in a case where the number of definitions thereof is large, the recording size of the log sometimes becomes large by recording the log for each job. Further, using such a method for recording the log for each job, a breakdown of the numbers of sheets printed with the respective ink tank types can be obtained from the log by counting the number of printed sheets using each counter. However, even though the numbers of used sheets can be grasped from the log, chronological information is lost from the log. Therefore, it is impossible to obtain information about in what order the ink tanks have been used or the like from the log. This brings a situation where the log recorded for each job lacks information used for a detailed analysis including the trouble analysis.

In the present embodiment, a method for recording the log in which a log in which the amount of information to be recorded is reduced is generated while maintaining effective information will be described. A brief explanation will be given below. As described above, the log is basically recorded for each job as the efficient method for recording the log in which the storage area is saved. In other words, the log is not divided even in the case of a new page and one log is recorded covering a plurality of pages. However, in a case where there arises, in one job, a change in information, for example, setting information to be designated in printing or environment information about the apparatus obtained from a sensor, the log is divided to be generated even in the single job. This makes it possible to make use of the log for service using a detailed user history such as the trouble analysis or abnormality prediction while maintaining the chronological information. The details will be described below.

Configuration of Apparatus

Figure 2:
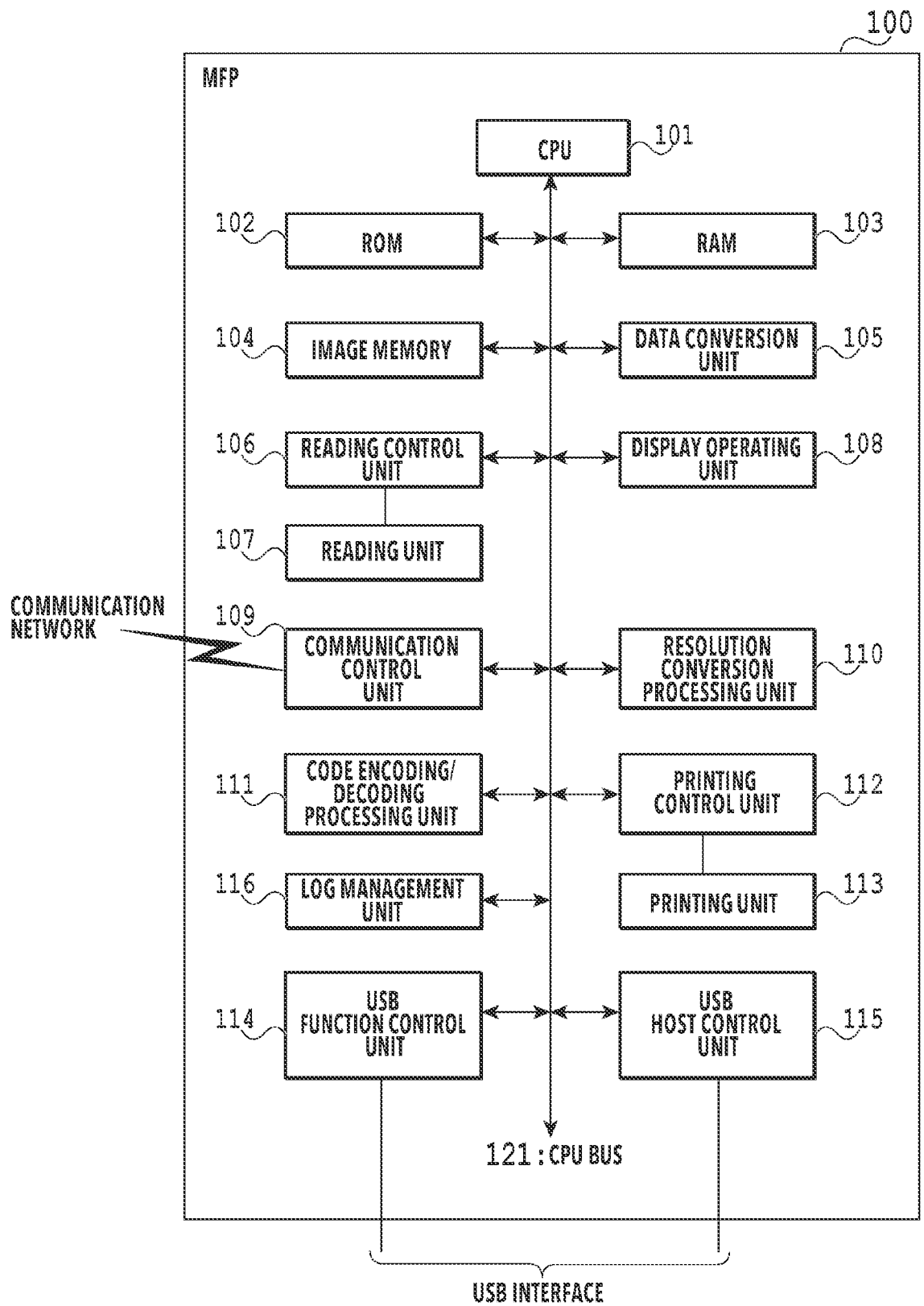
FIG. 2 is a block diagram showing a schematic configuration of an MFP.

FIG. 2 is a block diagram showing a schematic configuration of the MFP 100 in the present embodiment. The MFP 100 includes a CPU 101, a ROM 102, a RAM 103, an image memory 104, a data conversion unit 105, a reading control unit 106, a reading unit 107, a display operating unit 108, a communication control unit 109, a resolution conversion processing unit 110, a code encoding/decoding processing unit 111, a printing control unit 112, a printing unit 113, a USB function control unit 114, a USB host control unit 115, a log management unit 116, and a CPU bus 121.

The CPU 101 is a system control unit and controls the entire MFP 100. The ROM 102 stores fixed data such as a control program executed by the CPU 101, a data table, or a built-in operating system (OS) program. In the present embodiment, each control program stored in the ROM 102 performs software execution control, for example, scheduling, task switch, and interrupt processing under the management of the built-in OS stored in the ROM 102.

The RAM 103 includes a static random access memory (SRAM) or the like which requires backup power supply and retains data by means of a primary battery for data backup which is not shown in the figure. The RAM 103 stores data such as a program control variable which should not be erased. The RAM 103 is also provided with a memory area in which the generated log is stored and in a case where it is impossible to transmit the log to the log-collecting server 300, for example, in the case of not being connected to the Internet, the log is stored in this memory area. Upon transmission of the log to the log-collecting server 300, the log is deleted from the memory area in the RAM 103.

The image memory 104 includes a dynamic random access memory (DRAM) or the like and stores image data. In addition, a part of an area of the image memory 104 is used as a work area for executing software processing. The data conversion unit 105 performs, for example, analysis on a page description language (PDL) or the like to convert the image data. The reading unit 107 optically reads a document by a CIS image sensor to convert it to electric image data. The reading control unit 106 performs various types of image processing including binarizing processing and halftone processing on the converted image data through an image processing control unit which is not shown in the figure to output high-resolution image data. The reading control unit 106 and the reading unit 107 may use either of the following two control methods. A first method is a sheet reading control method in which reading is performed by a fixed CIS image sensor while the document is conveyed. A second method is a book reading control method in which a document fixed on a document platen is scanned by a moving CIS image sensor.

The display operating unit 108 includes a minimum key such as a numeral input key, a mode setting key, a determination key, or a cancel key and a light-emitting diode (LED) or a 7-segment display unit. The display operating unit 108 is capable of activating various functions as a multifunction peripheral by the user. The above-described various keys are realized as what is called softkeys displayed on an LCD and can receive the operation of the user. The LCD turns off a backlight to reduce power consumption in a case where the MFP is not on the job and the user has not operated the keys for a certain period of time.

The communication control unit 109 connects to the communication network and connects to an Internet provider and performs data communication with the log-collecting server 300. Regarding a connection to the communication network, a publicly-known method including HTTP, XMPP, and MQTT is used and explanation thereof will be omitted. The resolution conversion processing unit 110 performs resolution conversion control, for example, interconversion between image data of a millimeter system and image data of an inch system. It is also possible for the resolution conversion processing unit 110 to perform enlargement/reduction processing on image data. The code decoding processing unit 111 performs code encoding/decoding processing on image data. (uncompressed, MH, MR, MMR, JBIG, JPEG, or the like) handled by the MFP 100.

The printing control unit 112 performs various types of image processing such as smoothing processing, print density correction processing, or color correction on image data to be printed through the image processing control unit which is not shown in the figure, whereby the image data is converted to high-resolution image data and is output to the printing unit 113. The printing unit 113 is a printing unit which functions as a laser beam printer, an ink jet printer, or the like and prints color image data or monochrome image data generated by the printing control unit 112 on a printing member. The printing unit 113 includes a sensor for detecting the state of hardware controlled inside the printing unit. This sensor is capable of detecting motor temperature or the consumption state of a component, and detecting a mounted ink tank.

The USB function control unit 114 performs communication control over a USB interface and protocol control according to a USB communication standard. The USB function control unit 114 converts data from a USB function control task executed by the CPU 101 to a packet to perform USB packet transmission to the PC 200. The USB function control unit 114 also converts the USB packet from the PC 200 to data to transmit it to the CPU 101. The USB host control unit 115 is a control unit for performing communication by a protocol determined according to the USB communication standard. The USB communication standard is a standard capable of high-speed bilateral data communication and it is possible to connect one host (master) to a plurality of hubs or functions (slaves). The USB host control unit 115 has the function of the host in USB communication.

The log management unit 116 obtains information related to the job from the reading control unit 106 and the printing control unit 112 to generate the log as history information. The generated log is recorded in the memory area, in the RAM 103, where the log is stored. It is to be noted that the above-described constituent elements 101 to 106, 108 to 112, and 114 to 116 are interconnected via the CPU bus 121 managed by the CPU 101.

Figure 3:
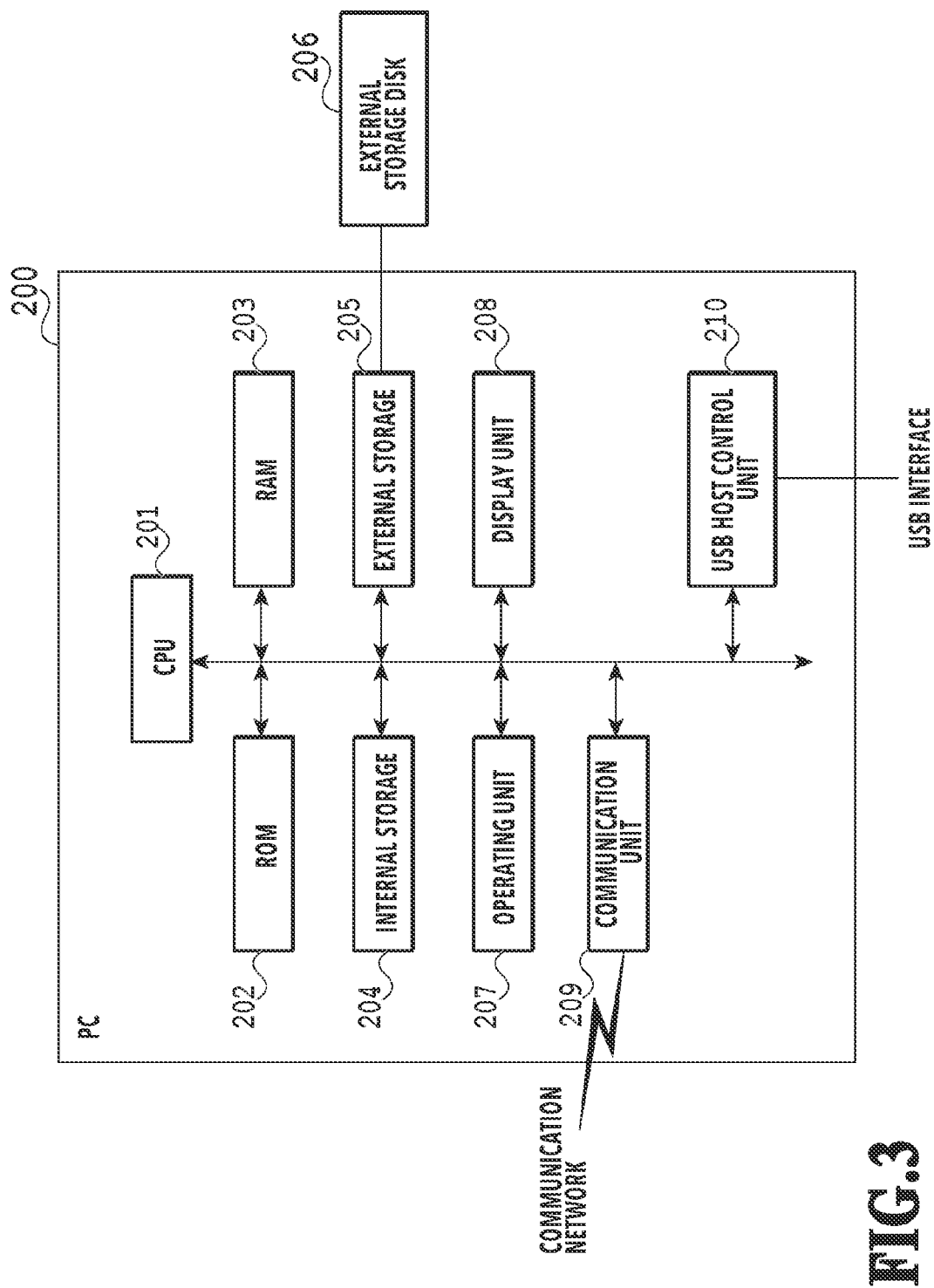
FIG. 3 is a block diagram showing a schematic configuration of a PC.

FIG. 3 is a block diagram showing a schematic configuration of the PC 200. The PC 200 includes a CPU 201, a ROM 202, a RAM 203, internal storage 204, external storage 205, an operating unit 207, a display unit 208, a communication unit 209, and a USB host control unit 210. The CPU 201 controls, via a system bus, the entire operation of the PC 200 according to a program read from the ROM 202, the RAM 203, the internal storage 204, or an external storage disk 206. The ROM 202 stores a control program of the CPU 201 or the like. The RAM 203 temporarily stores the program or image data to perform the processing of the PC 200 at a high speed. The internal storage 204 stores an operating system, various application programs, the image data, and the like. These application programs normally receive data from the external storage disk 206 (such as CD/DVD media), which is a computer-readable medium storing these application programs, to perform installation by controlling the external storage 205. The operating unit 207 controls a keyboard or a mouse (not shown) as means for inputting an instruction from an operator. The display unit 208 performs various displays to the operator. The communication unit 209 connects to a communication network and connects to the Internet provider to perform data communication. The USB host control unit 210 is a control unit for performing communication by a protocol determined according to the USB communication standard. Although the configuration of the PC 200 has been described as the configuration of an information processing apparatus in FIG. 3, the configuration of the log-collecting server 300 is also a configuration identical to the configuration of the information processing apparatus in FIG. 3.

Flowchart

Figure 4:
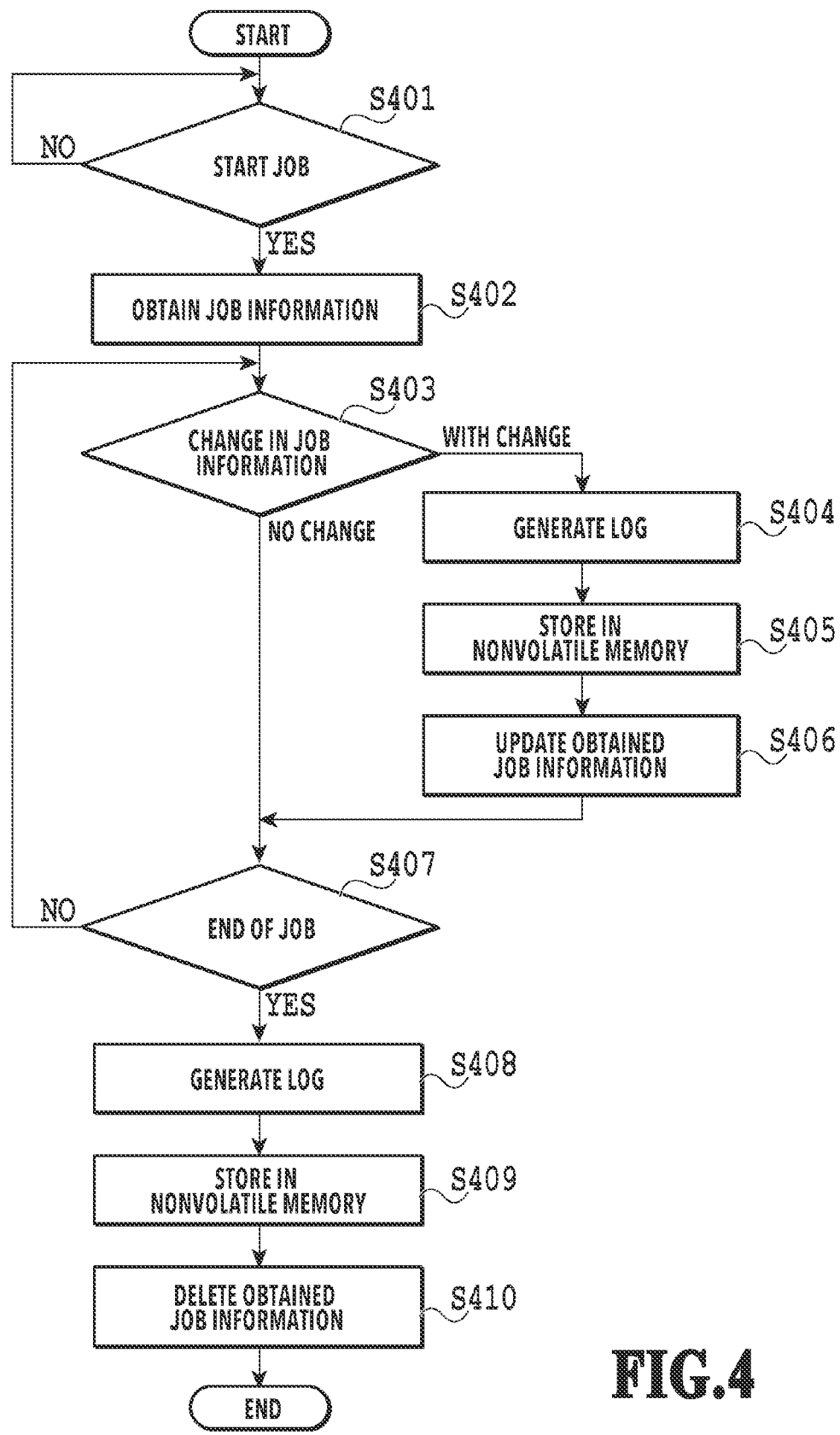
FIG. 4 is a flowchart showing processing in which the MFP records a log.

FIG. 4 is a flowchart showing processing in which the MFP 100 records a log in the present embodiment. A series of steps shown in FIG. 4 is performed by developing, in the RAM 103 and executing a program code stored in the ROM 102 by the CPU 101 of the MFP 100. More specifically, the steps shown in FIG. 4 are steps performed by the log management unit 116 or a part of or all of the functions of steps in FIG. 4 may be realized using hardware including an ASIC or an electronic circuit. The sign "S" used for the explanation of each step means a step in the flowchart.

In S401, the user operates the PC 200 or the MFP 100 to provide an instruction for printing, copying, or the like and with this matter acting as a trigger, the log management unit 116 detects the start of the processing of the job. Upon detection of the start of the processing of the job, the process proceeds to S402 and the step of S401 is repeated in the case of not detecting the start of the processing of the job, that is, in the case of not receiving the instruction from the user.

In S402, the log management unit 116 obtains job information about the job the start of which has been detected. The job information is information related to the job and includes information about a print setting and the environment information. The information about the print setting is information about a setting, for example, a setting of double-side printing designated in printing or print quality. In addition to that, the information about the print setting also includes information about a job identifier which uniquely specifies the job, the number of printed sheets, and the like. The environment information is information obtained from the sensor which indicates, for example, the state of the apparatus. The log management unit 116 generates the log based on the obtained job information. The obtained job information is retained in the log management unit 116.

In S403, the log management unit 116 determines whether there is a change in a print condition specified by the job information. The change in the print condition can be determined based on information transmitted from the reading control unit 106 or the printing control unit 112 for example. In a case where there is the change in the print condition (that is, the change in the job information) during the processing of the job whose start has been detected in S401, the process proceeds to S404, and in a case where this is not the case, the process proceeds to S407. Incidentally, only in the case of a change in predetermined job information of the job information, the process may proceed to S404 and in a case where this is not the case, the process may proceed to S407. In other words, job information for which the log is divided to be generated may be determined in advance such that the process proceeds to S404 in a case where there is the change in the target job information and the process may proceed to S407 in a case where there is a change in job information other than the target job information (job information different from the target job information).

In a case where there is the change in the job information during the processing of the job, the log management unit 116 performs, in S404, log generating processing using information as of this point in time (information immediately before the job information changes) without waiting for the end of the job. In the log generating processing, one log is generated based on the obtained and retained job information and the process then proceeds to S405 where the log management unit 116 stores the generated log in the memory area in the RAM 103, which is the nonvolatile memory. The log management unit 116 then performs, in S406, update of the job information obtained in S402. For example, the log management unit 116 obtains the job information again to re-store the obtained job information, thereby performing update of job information currently referred to. The process then proceeds to S407.

In S407, whether the job which has started in S401 is ended is detected. In the case of the end of the job, the process proceeds to S408 and in a case where this is not the case, that is, in a case where the job is still being done, the process returns to S403 to repeat the process. For example, in a case where there is the change in the job information again during the processing of the single job, the process proceeds to S404 again to generate a log at that point in time again. This means that after the start of the job, in a case where a log as of a first point in time is generated at the first point in time, in a case where the change in the job information is detected again as of a second point in time, a log for a period from the first point in time when the log is generated until the second point in time is newly generated.

In the case of detection of the end of the job, the log management unit 116 generates, in S408, one log based on the obtained and retained job information as of that point in time. The process then proceeds to S409 where the log management unit 116 stores the generated log in the memory area in the RAM 103, which is the nonvolatile memory. In S410, the log management unit 116 deletes the obtained and retained job information to end the process.

As described above, in the present embodiment, in generating the log for each job, the log is divided to be generated in the case of the change in the job information. Division and generation of the log is performed during the processing of the single job, not at the end of all the processes of the single job. In other words, processing of generating one log is performed based on information before the change at timing when there arises the change in the job information in the single job. As a result, it seems that the log is divided to be generated in a case where the single job is viewed as a whole. The log is divided to be generated in this manner, whereby it is possible to generate a log in which the amount of information to be recorded is reduced while maintaining the effective information including the chronological information.

Specific Examples

Figure 5:
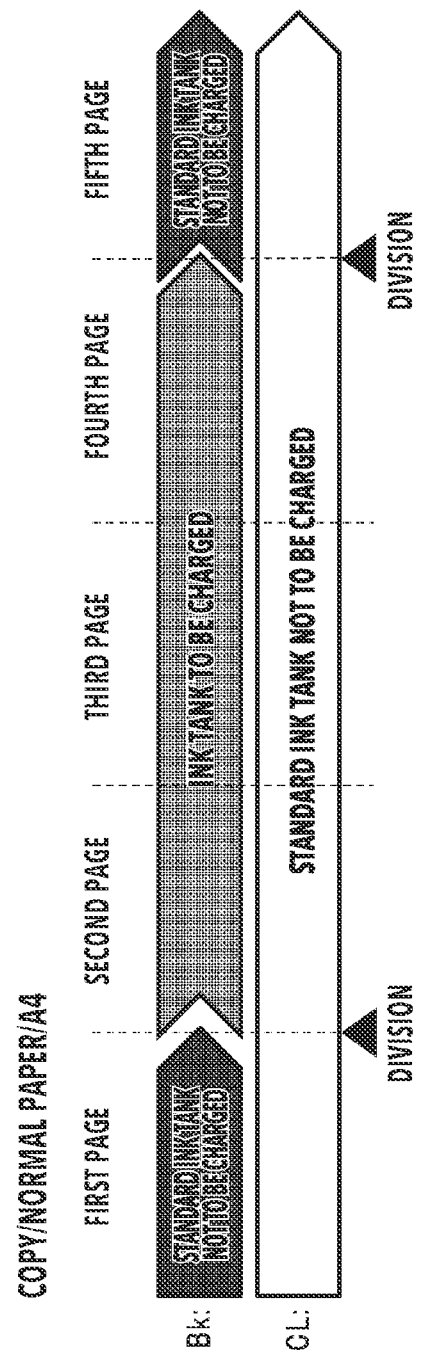
FIG. 5 is an image diagram showing a case where an ink tank is replaced during a job.

Specific examples will be described with reference to FIG. 5 and FIGS. 6A to 6C. FIG. 5 is a diagram in which the contents of a job specified using the job information are visualized. FIGS. 6A to 6C are diagrams showing an example of a log generated in processing the job according to the job information in FIG. 5.

FIG. 5 is the image diagram showing a case where an ink tank is replaced during a single job of copying using a normal paper of A4 size. In this case, an example is used in which the user makes the copy using the normal paper of A4 size, and a Bk (black) ink tank is replaced both at the end of the first page and the end of the fourth page such that the copying is continuously performed up to the fifth page. Upon input of a copy job, the log management unit 116 first obtains and retains, as the print setting information, a job ID issued for each job, a Job Mode which indicates the type of jobs, and information about the type and size of media to which the copy is output. The log management unit 116 also obtains and retains, as the environment information, information about the type of ink tank which indicates the type of ink tank mounted and an ink tank identification ID. These actions correspond to the step S402 in FIG. 4.

Next, the log management unit 116 detects a change in the ink tank identification ID between the first page and the second page and then detects that the Bk ink tank has been replaced from a standard ink tank (the general ink tank which is not the subscription service target) not to be charged to an ink tank to be charged (an ink tank which is the subscription service target). In short, the log management unit 116 detects that there has been the change in the job information (print condition) (S403). Even during the job, the log management unit 116 generates, based on the retained job information, a log in which the type of the Bk ink tank is set to the standard ink tank not to be charged. This log corresponds to the log of the first page in FIG. 6A. The log management unit 116 then updates the information about the type of ink tank mounted as the Bk ink tank and the identification ID of the retained job information (S406) to continuously monitor the change in the job information.

Further, the log management unit 116 detects a change in the ink tank identification ID between the fourth page and the fifth page and detects that the ink tank to be charged has been replaced with the standard ink tank not to be charged. In short, the log management unit 116 detects that there has been the change in the job information (print condition) (S403). Even during the job, the log management unit 116 generates, based on the retained job information, a log in which the type of the Bk ink tank is set to the ink tank to be charged. This log corresponds to the log of the second to fourth pages in FIG. 6B. The log management unit 116 then updates the information about the type of the Bk ink tank and the identification ID of the retained job information to subsequently perform print processing of the last fifth page.

The print processing of the fifth page brings the end of the processing of this job and the log management unit 116 generates a log based on the retained job information at the end of the job. The generated log is a log in which the type of the Bk ink tank is set to the standard ink tank not to be charged as shown in FIG. 6C.

As described above, in the present case, in a case where the processing of one job of copying of five pages is ended, in response to the change in the job information during the processing of the job, the log is divided into three logs to be generated. In the present example, as shown in FIGS. 6A to 6C, no printed-sheet counter is provided for each item of the job information including the mounted ink tank. In other words, a printed-sheet counter for counting the number of sheets printed with the standard ink tank not to be charged and a printed-sheet counter for counting the number of sheets printed with the ink tank to be charged are not provided. As shown in FIGS. 6A to 6C, a log including one printed-sheet counter and the values of various types of job information is generated instead. By generating such a log, even in a case where there exist a plurality of patterns of the items of the various types of job information, it is not necessary to provide a printed-sheet counter for each item, which leads to saving of the record size of the log.

For example, a case is assumed where a log is recorded in a case where there is a possibility that the type of sheet and the type of ink tank change for each page. In a case where there exist N ink tank types and there exist M media types, the record size of the size of a prints counter×(M+N) is necessary. On the other hand, in the present embodiment, one printed-sheet counter and areas each storing the definition value of the type of sheet and the definition value of the type of ink tank are provided. Thus, in a case where there are many items which change for each page and the number of definitions which change for each page is large, that is, in a case where the value of (M+N) described above is large, a saving effect on the recording area of the nonvolatile memory produced by using the present embodiment is increased.

On the other hand, the log-collecting server 300 which has received these divided logs can use the Job ID (job identifier) given for each job to associate the divided logs with each job. Thus, the log-collecting server 300 is capable of obtaining information about counting for each job and a use history of the user. As shown in FIGS. 6A to 6C, since the log is chronologically generated, a log which has been given the Job ID of "0001" is analyzed in chronological order, whereby the log-collecting server 300 can confirm the state of the change in the job information as well as the breakdown of the numbers of printed sheets on each condition. This means that the log-collecting server 300 can detect that the job information changes at the end of the first page and at the end of the fourth page as shown in FIGS. 6A, 6B, and 6C. This chronological information is useful information in service including a charging system which requires high accuracy. For example, in a case where some problem arises and service that the user has expected cannot be offered to the user, it is necessary to provide a follow-up afterward. In a case where the timing or the number of times of ink replacement affects the contents of service to be provided, a follow-up with higher accuracy can be conducted by including the chronological information in the log. In addition, by adding the chronological information, it is also possible to detect whether the service is properly used. For example, a case is assumed where two-time ink tank replacement between pages as shown in FIG. 5 is impossible due to the operation specifications of the MFP 100. In this case, by analyzing the log generated in the present embodiment, the log-collecting server 300 can detect two-time ink tank replacement that it was impossible to detect by using the record of the log only with a breakdown such that information about a single job is recorded for each job as a log. This makes it possible to detect a user who uses the MFP out of an operation guarantee.

Comparative Example

FIGS. 7A and 7B are diagrams showing a log of a comparative example. FIG. 7A are diagrams showing an example in which the log is recorded for each page. FIG. 7B shows an example in which the log is recorded for each job and is a diagram showing an example in which division and generation of the log as shown in FIGS. 6A to 6C are not performed. In FIG. 7A, since the log is recorded for each page, the amount of information about the log to be recorded increases as the number of pages increases. In FIG. 7B, although the log is recorded for each job, as described above, in a case where there exist N ink tank types and there exist M media type, the record size of the size of the prints counter×(M+N) is necessary. On the other hand, by dividing the log in the manner shown in FIGS. 6A to 6C of the present embodiment, it is possible to generate the log in which the amount of information to be recorded is reduced while maintaining the effective information.

Specific Example 2

Figure 8:
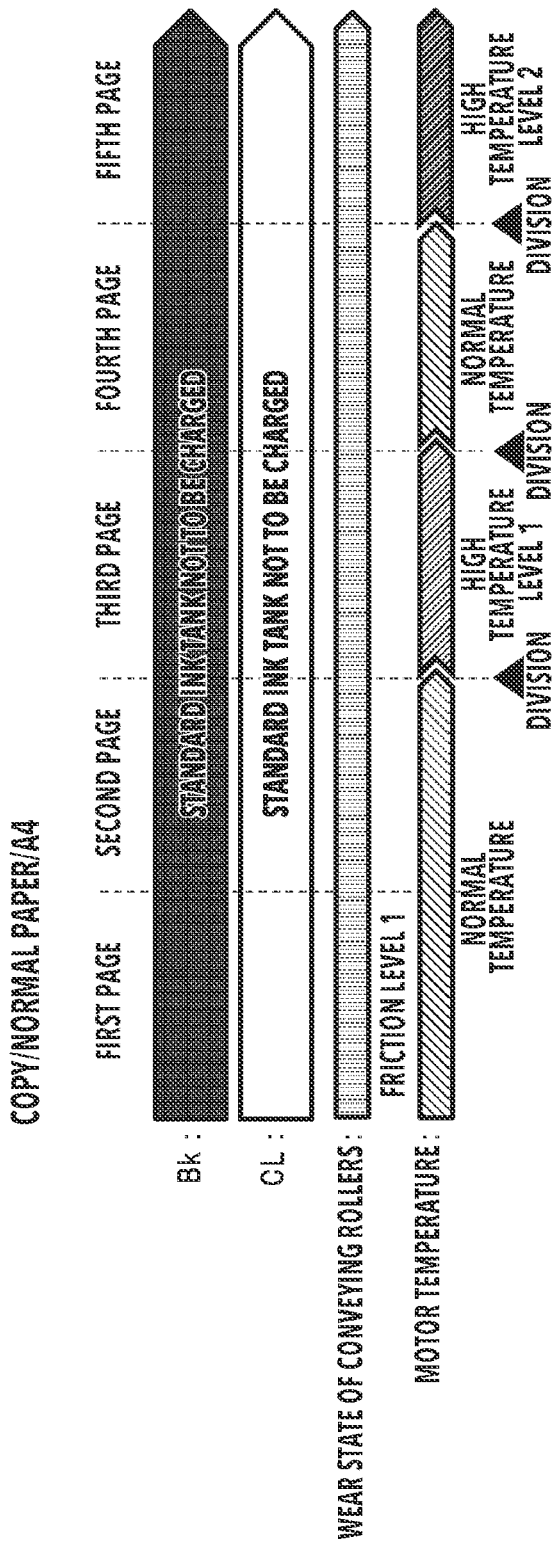
FIG. 8 is an image diagram showing a case where the status of motor temperature changes during the processing of the job.

Another specific example of the present embodiment will be described with reference to FIG. 8 and FIGS. 9A to 9D. FIG. 8 and FIGS. 9A to 9D show an example in which a change in environment information is detected to divide the log. FIG. 8 is an image diagram showing a case where in the case of processing a job of copying using a normal paper of A4 size, the status of motor temperature changes during the processing of the job. FIGS. 9A to 9D are diagrams showing a log to be generated in the case of FIG. 8.

In this case, the user makes the copy using the normal paper of A4 size and there arises a change in the status of the motor temperature at the end of the second, third, and fourth pages. Upon input of the copy job, the log management unit 116 first obtains and retains, as the print setting information, the job ID issued for each job, the Job Mode which indicates the type of job, and information about the type and size of media to which the copy is output. The log management unit 116 also obtains and retains, as the environment information, the information about the type of ink tank which indicates the type of ink tank mounted and the ink tank identification ID. The log management unit 116 also obtains and retains, as the environment information, information about the internal status of the information processing apparatus. In the present example, the log management unit 116 obtains and retains, as the information about the internal status, the wear state of conveying rollers and the status of motor temperature. These actions correspond to the step S402 in FIG. 4.

Next, the log management unit 116 detects a change in the status of motor temperature between the second page and the third page and then detects that the motor temperature has changed from normal to a high-temperature level 1. In short, the log management unit 116 detects that there has been the change in the job information (S403). Further, even during the job, the log management unit 116 generates, based on the retained job information, a log in which the motor temperature status is set to a normal temperature. This log corresponds to the log of the first to second pages in FIG. 9A. The log management unit 116 then updates information which indicates the motor temperature status of the retained job information (S406) to continuously monitor the change in the job information.

Further, the log management unit 116 detects the motor temperature status between the third and fourth pages again and detects that the motor temperature has changed from the high-temperature level 1 to normal. In short, the log management unit 116 detects that there has been the change in the job information (S403). Even during the job, the log management unit 116 generates, based on the retained job information, a log in which the motor temperature status is set to the high-temperature level 1. This log corresponds to the log of the third page in FIG. 9B. The following processing is also performed similarly by the log management unit 116 to generate a log in which the motor temperature status is set to the normal temperature between the fourth and fifth pages. This log corresponds to the log of the fourth page in FIG. 9C. The log management unit 116 finally generates, based on the retained information, a log in which the motor temperature status is set to a high-temperature level 2 at the end of the job of the fifth page. This log corresponds to the log of the fifth page in FIG. 9D.

Thus, in the present case, in response to changes in the job information with respect to one job of printing five pages, the log is divided into four logs to be generated. In the present example, a printed-sheet counter is not provided for each wear state of conveying rollers or for each motor temperature status but a log is used in which one printed-sheet counter makes up each item. This makes it unnecessary to provide a printed-sheet counter for each pattern even in a case where there exist a plurality of patterns of the status of the conveying rollers or the temperature. Thus, the record size of the log can be saved and it is possible to make use of the nonvolatile memory efficiently in the image forming apparatus with poor recording capacity of the nonvolatile memory.

Meanwhile, the log-collecting server 300 which has received these divided logs can use the Job ID given for each job to associate the divided logs with the respective jobs. Thus, the log-collecting server 300 is capable of obtaining information about the counting for each job and the use history of the user. By analyzing the divided logs in chronological order, the log-collecting server 300 can analyze status transition during the job as well as the breakdown of the numbers of printed sheets on each condition as shown in FIGS. 9A to 9D. This means that the log-collecting server 300 can obtain information as shown in the image diagram in FIG. 8 from the log. This chronological information is useful information in providing service including abnormality prediction of the apparatus which requires a large amount of information. For example, in addition to the timing of carrying out the job, information about the motor temperature during the job or various sensors is included in the log, whereby it is possible to analyze these status transitions. As a result, wild fluctuations in the motor temperature and other sudden changes in the sensor state can be detected such that it is possible to make use of the detected information in the abnormality prediction or failure analysis in case of failure. For example, in a case where the motor temperature does not gradually rise between pages, but the temperature wildly fluctuates between the pages as shown in FIG. 8, it is possible to presume that, for example, this case indicates that there is trouble with the motor or a part around the motor.

As has been described above, the log management unit 116 obtains the job information such as the print setting information to be designated in printing or the environment information about the apparatus obtained from the sensor in generating the log of the single job. In the case of detecting the change in the job information during the processing of the job, the log is divided to be generated even during the job before and after the change. No printed-sheet counter is provided for each item of the job information and one printed-sheet counter and the values of various types of job information make up the log generated in such a manner. This saves the storage area and makes it possible to record the log efficiently. Further, since the log is recorded efficiently without losing the chronological information, it is possible to make use of the log also for service using a detailed user history such as charging service or the abnormality prediction. As described above, according to the processing of the present embodiment, it is possible to generate the log in which the amount of information to be recorded is reduced while maintaining the useful information.

Other Embodiments

In the above-described embodiments, it is assumed that the log management unit generates the log for each job as basic specifications. However, a job group which is a combination of a plurality of jobs may be taken as a basic unit, and a log for each job group may be divided in response to the change in the job information. Additionally, even though the change in the mounted ink tank information or the motor temperature has been described as an example, a matter to be detected is not limited to these examples. Other changes in information related to the print setting set by the user or an external apparatus connected to the image forming apparatus may be detected.

In the above-described embodiments, even though the image forming apparatus has been described as an example of the information processing apparatus which generates and stores the log, the information processing apparatus is not limited to this. The configuration is applicable to any information processing apparatus which performs processing control based on a predetermined job and generates a log at that time to record the log.

Further, in the above-described embodiments, an example in which the information processing apparatus transmits the log to the log-collecting server 300 and deletes the transmitted log from the storage medium of the information processing apparatus has been described. At this time, in a case where a state in which the information processing apparatus cannot communicate with the log-collecting server 300 continues and the log reaches an upper limit to the storage area of the storage medium, the invention may also be configured such that use of the information processing apparatus is limited.

Furthermore, in the above-described embodiments, an example in which the log is transmitted to the log-collecting server 300 has been described. However, in a case where the MFP 100 records the log inside and the amount of record exceeds a predetermined amount of record, the configuration is applicable to an information processing apparatus in which the log is deleted in chronological order.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-135747, filed Aug. 11, 2020, which is hereby incorporated by reference herein in its entirety.

What is claimed is:

1. An image processing apparatus configured to perform processing according to a job, comprising:
   a memory containing instructions; and
   a processor for executing the instructions, the instructions being executed to:
   detect a change in job information which is information related to an execution of the job; and
   generate a log related to the processing of the job,
   wherein in a condition that the job includes a plurality of pages,
      in a case where the change in the job information is not detected, one log is generated with the job as a unit, and
      in a case where the change in the job information is detected, a log is generated even during the job based on job information before the change, and
   wherein in a case where the change in the job information is detected at a first point in time, a log as of the first point in time is generated, and
   in a case where the change from the first point in time in the job information is detected at a second point in time which is a point later than the first point in time, a log from the first point in time to the second point in time is generated.

2. The image processing apparatus according to claim 1, wherein in a case where the job ends, a log is generated as of a point where the job ends regardless of the change in the job information.

3. The image processing apparatus according to claim 1, wherein the logs are generated by dividing job information into job information before the change and job information after the change, and
   the divided and generated logs have a same job identifier.

4. The image processing apparatus according to claim 1, wherein the instructions are further executed to store the generated log inside the image processing apparatus; and
   to transmit the stored log to a server.

5. The image processing apparatus according to claim 4, wherein in the case of transmitting the log, the log is deleted from storage, and in a case where the log cannot be transmitted, the log is not deleted from storage.

6. The image processing apparatus according to claim 5, wherein in a case where the stored log reaches an upper limit of a storage area, use of the image processing apparatus is limited.

7. The image processing apparatus according to claim 1, wherein the image processing apparatus is an image forming apparatus, and
   the instructions are executed to generate a log which does not include a number of printed sheets for each item which can be defined using the job information.

8. The image processing apparatus according to claim 7, wherein a log is generated which includes the number of printed sheets and a mounted ink tank type.

9. The image processing apparatus according to claim 7, wherein the job information includes information about a mounted ink tank or a print setting, and
   a change in the mounted ink tank or the print setting is detected.

10. The image processing apparatus according to claim 7, wherein the job information includes information from a sensor arranged in the image processing apparatus,
    a change in the information from the sensor is detected, and a log which includes the information from the sensor is generated.

11. The image processing apparatus according to claim 10, wherein the information from the sensor includes information about internal status of the image processing apparatus.

12. The image processing apparatus according to claim 1, wherein the image processing apparatus performs the processing according to a plurality of jobs and records the log with the plurality of jobs as a unit.

13. The image processing apparatus according to claim 1, wherein the job information is predetermined job information which is a target for a division of the log,
   in the case of detecting a change in the predetermined job information, a log is generated based on the job information before the change even during the processing of the job, and in the case of detecting a change in job information different from the predetermined job information, a log is not generated based on the change in the different job information.

14. A method for controlling an image processing apparatus configured to perform processing according to a job comprising:
   detecting a change in job information which is information related to an execution of the job; and
   generating a log related to the processing of the job,
   wherein in a condition that the job includes a plurality of pages,
      in a case where the change in the job information is not detected, one log is generated with the job as a unit, and
      in a case where the change in the job information is detected, a log is generated even during the job based on job information before the change, and
   wherein in a case where the change in the job information at a first point in time is detected, a log as of the first point in time is generated, and
   in a case where the change from the first point in time in the job information is detected at a second point in time which is a point later than the first point in time, a log from the first point in time to the second point in time is generated.

15. A non-transitory computer-readable storage medium storing a program which causes a computer configured to perform processing according to a job to:
   detect a change in job information which is information related to an execution of the job; and
   generate a log related to the processing of the job,
   wherein in a condition that the job includes a plurality of pages,
      in a case where the change in the job information is not detected, one log is generated with the job as a unit, and
      in a case where the change in the job information is detected, a log is generated even during the job based on job information before the change, and
   wherein in a case where the change in the job information is detected at a first point in time, a log is generated as of the first point in time, and
   in a case where the change from the first point in time in the job information is detected at a second point in time which is a point later than the first point in time, a log from the first point in time to the second point in time is generated.

* * * * *